United States Patent [19]

Markwell

[11] Patent Number: 4,860,382
[45] Date of Patent: Aug. 29, 1989

[54] PROTECTIVE GARMENT

[75] Inventor: Edgar R. Markwell, Wereham, England

[73] Assignee: Freudenberg Nonwovens Ltd., England

[21] Appl. No.: 136,259

[22] Filed: Dec. 22, 1987

[30] Foreign Application Priority Data

Dec. 24, 1986 [GB] United Kingdom ................ 8630881

[51] Int. Cl.⁴ .......................................... A41D 13/00
[52] U.S. Cl. ................................................ 2/82; 2/69; 2/79; 2/2
[58] Field of Search .................... 2/82, 81, 79, 69, 2

[56] References Cited

U.S. PATENT DOCUMENTS

| 4,034,417 | 7/1977 | Ellis | 2/81 |
| 4,223,064 | 9/1980 | Ballif, III et al. | 2/81 X |
| 4,242,769 | 1/1981 | Rayfield et al. | 2/79 X |
| 4,272,851 | 6/1981 | Goldstein | 2/82 X |

Primary Examiner—H. Hampton Hunter
Attorney, Agent, or Firm—Neal J. Mosely

[57] ABSTRACT

A protective garment is shown for protecting the wear against noxious chemicals in liquid aerosol and vapor form. The protective garment is made up of two separate plies, the first ply comprising a fire retardant fabric having bonded to it a microporous material arranged such that the microporous material can allow passage of moisture vapor but prevent passage of droplets in liquid; and a second inner ply including a vapor absorbent material.

9 Claims, 1 Drawing Sheet

PROTECTIVE GARMENT

BACKGROUND OF THE INVENTION

1. Field of the Invention

The invention relates to a protective garment for protecting the wearer against noxious chemicals in liquid aerosol and vapor form.

2. Brief Description of the Prior Art

A number of different garments have been devised with this purpose. Typically they comprise an outer layer, typically of a woven material which includes mean or is so treated to prevent passage of liquid and an inner layer including an absorbent layer to absorb any gaseous contaminants from reaching the wearer's skin. The problem which arises is that the material used in the outer layer has to be able to prevent the passage of liquid droplets and therefore there can be a build-up of heat stress to the wearer because his body vapor cannot escape. Attempts have been made to include in such suits specially designed one-way vents to allow the wearer's body vapor to escape to the atmosphere without allowing any atmospheric liquids to pass through to the wearer. Clearly in order to prevent any passage of contaminants through such a vent they have to be very carefully designed and made.

SUMMARY OF THE INVENTION

According to the invention there is provided a protective garment made up of two separate plies, the first ply consisting of a fire retardant fabric having bonded to it a microporous material arranged such that the microporous material can allow passage of moisture vapor but prevent passage of droplets of liquid; and a second inner ply including a vapor absorbent material.

Thus, the garment has two layers which allow the escape of the gaseous body vapors from the wearer but prevent contamination of the wearer by liquid or aerosol contaminant via the microporous material or vapor contaminant by the inner absorbent ply.

Typically the microporous material will be a film of polyurethane such as that sold under the trade mark PORELLE by Porvair Limited of Estuary Road, Riverside Industrial Estate, KING'S LYNN, Norfolk, England. Preferably the thickness of the PORELLE used is between 30 and 60 microns thick. More preferably, the thickness of the PORELLE is 50 to 60 microns. The hydrostatic head of the PORELLE is at least 700+ cm of water and therefore the material can prevent pressure penetration of liquid.

Preferably the outer layer of the first ply is a fire retardant woven fabric such as a nylon/modacrylic mixture which has good wearing capability. Preferably the outer layer of the first ply is attached to the microporous material by a discontinuous polyamide adhesive.

Preferably the second ply is a filter-like fire retardant fabric with a layer of polymeric absorber or charcoal. Such a layer is capable of preventing toxic vapors from contacting the skin.

Preferably the garment is designed such that the two plies are both held together at the seams of the garment. The two plies have separate openings allowing the garment to be removed.

The openings may not be coincident. The outer ply may include two slide fasteners, one slide fastener arranged horizontally from shoulder to shoulder with a second slide fastener running diagonally from one shoulder to opposite thigh arranged such that when both slide fasteners are open the outer ply can be pulled back to provide a triangular opening with the material being folded back along a vertical line from shoulder to thigh. In this way the wearer may open up the garment to keep him cooler at times when he knows he only needs protection against gaseous contaminants rather than from liquid contaminants. Preferably the inner ply has a vertical slide fastener at the center of the front which allows an under chin fastening to be released so that the garment's hood can be removed from the head, each separate ply separately.

Alternatively the outer may have a vertical central slide fastener coincident with the slide fastener of the inner ply. The slide fasteners have to prevent ingress of liquid, aerosol or vapor contaminant. The slide fastener is typically a standard zipper fastening with a flap of ply material overlaying the zipper.

BRIEF DESCRIPTION OF THE DRAWINGS

An example of a protective garment in the form of a one-piece suit is shown schematically in the accompanying drawings by way of example only, in which.

DESCRIPTION OF THE PREFERRED EMBODIMENT

Figure 1:
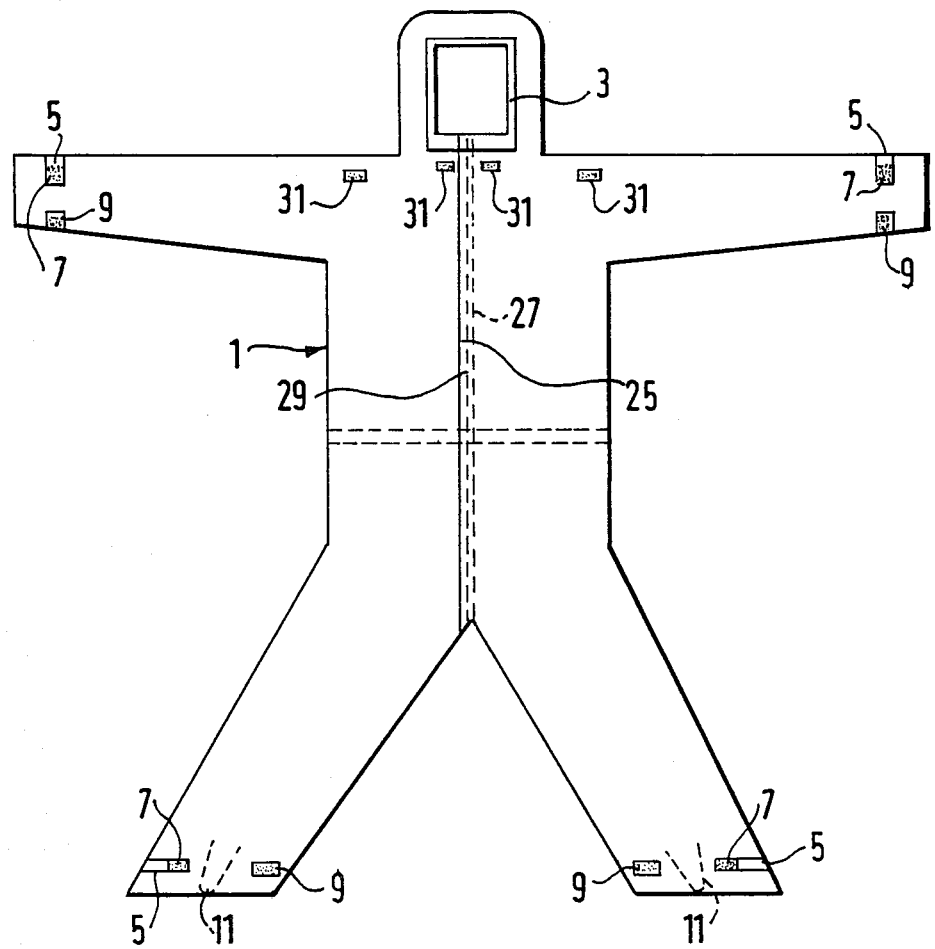
FIG. 1 is a front view of the garment.
Figure 2:
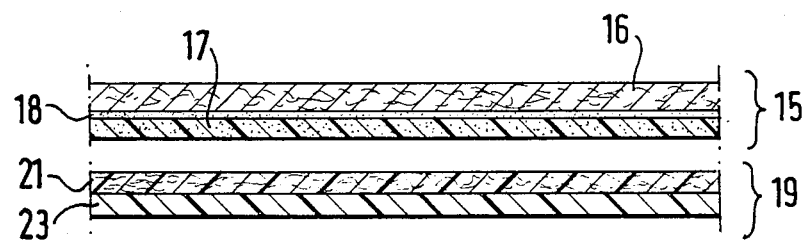
FIG. 2 is a section through the garment.

The protective garment 1 shown in the drawings is a one-piece suit. It has an integral hood which is close fitting by elastic around its face-contacting periphery 3 and fastened at the wrist and ankles additionally by a touch and close fastener such as that sold under the trade mark VELCRO (VELCROL in the U.K.). Each touch and close fastener comprises a tab 5 attached to the outside of the garment.

On the inwardly facing surface of the tab 5 is a strip 7 of touch and close fastening. Spaced from the end of tab 5 is a second strip 9 of touch and close fastening. By moving the tab to bring strips 7 and 9 into contact, the wrists and ankles of the garment are drawn in tightly and held closed. Elastic stirrups 11 help to hold the trouser part of the garment firmly. The garment is elastic at waist 13 for ease of wearing.

The garment is made up to two separate plies. The two plies are separate sheets of material which are connected together just at the seams of the garment. The outer ply 15 is made up of two layers 16 and 17 bonded to each other by discontinuous adhesive 18. The outer layer 16 is a fire retardant woven fabric. The fabric discontinuous adhesive has been used in prior protective garments and is a web of low melt polyamide fibers. The inner layer 17 of the first ply is a layer of microporous material which is arranged such that it will allow passage of water vapor but not allow the passage of liquids including toxic liquids. This layer is, in this case, a polyurethane film sold under the trade mark PORELLE by Porvair Limited of Estuary Road, Riverside Industrial Estate, KING'S LYNN, Norfolk, England.

There are two forms of PORELLE which can be used. One type of PORELLE is 50 microns thick. This has a moisture vapor permeability (at 37° C.) of $2500/m^2/24$ hours but a hydrostatic head of 350 cms. (British Standards 3424 method 29C). The second type of PORELLE known as PORELLE II is 40 microns thick with a water vapor permeability of $3600 g/m^2/24$ hour (at 37° C.) and a hydrostatic head of 700+ cm.

water (British Standard 3423 method 29C). The preferred form of microporous material is PORELLE II.

The inner ply of the garment 19 is a filter-like fabric 21 treated for flame retardant and liquid repellancy which is a blend of natural and synthetic fibers bonded by a resin with an absorbent or absorbent layer 23 of polymeric absorber or charcoal similar substance bonded by synthetic rubber which prevents toxic vapors contacting the skin. Such fabrics have been used in protective garments before and their choice will be readily apparent to the man skilled in this field. The materials used in plies 16 and 17 and the adhesive material 18 are individually known in the art but not in the continuation disclosed and claimed herein.

The design of the suit is such that it has two front openings 25 in two stages where the outer ply 15 opens separately from the inner layer 19. The two openings do coincide and thus only one is shown in the drawings. Each layer has a central slide fastener 27 shown in dotted line on the drawing. This is a standard zipper fastener covered by a flap 29 to ensure that nothing passes through the opening. If the wearer is aware that at a particular stage he has only to be protected from possible gaseous contaminants, he can open up the first ply by undoing one slide fastener and folding the first ply outwards to give a central triangular shaped opening in the suit to allow the wearer to be very cool. The vent can be fastened into position out of the way of the wearer by a touch and close fastener 31.

I claim:

1. A protective suit made up of separate outer and inner plies held together at seams in the suit, the outer ply comprising a fire-retardant fabric having bonded to it a microporous material arranged such that the microporous material arranged such that the microporous material can allow passage of moisture vapor but prevent passage of droplets of liquid; and the inner ply including a vapor-absorbent material; and where in the outer and inner plies have separate openings and separable fastenings means for securing each of said opening in a closed position, allowing the suit to be removed, whereby the outer ply can be opened while the inner ply is closed.

2. A protective suit according to claim 1, in which the microporous material comprises a film of polyurethane characterized by having a hydrostatic head of at least 700+ cm of water to prevent pressure penetration of liquid.

3. A protective suit according to claim 2, in which the thickness of the polyurethane film is between 30 to 60 microns.

4. A protective suit according to claim 3, in which the thickness of the polyurethane film is between 50 and 60 microns.

5. A protective suit according to claim 1, in which the fire-retardant fabric is the outer layer of the outer ply.

6. A protective suit according to claim 1, in which the fire-retardant fabric is a woven nylon/modarylic mixture.

7. A protective suit according to claim 1, in which the fire-retardant fabric is bonded to the microporous material by a discontinuous adhesive.

8. A protective suit according to claim 1, in which the inner ply is a filter-like fire-retardant fabric comprising a layer of polymeric absorber or charcoal.

9. A protective suit according to claim 1, including a hood, in which each of the outer and inner plies has a vertical slide fastener at the enter of the front thereof comprising said separable fastening means, which provide a releasable under-chin fastening so that each ply can be separately opened to permit the hood to be removed from a wearer's head.

* * * * *